US012649867B2

(12) United States Patent
Jersblad

(10) Patent No.: US 12,649,867 B2
(45) Date of Patent: Jun. 9, 2026

(54) CAMOUFLAGE TAPE, AND CAMOUFLAGE TAPE SYSTEM FOR TEMPORARY MULTISPECTRAL CAMOUFLAGE OF OBJECTS

(71) Applicant: SAAB AB, Linköping (SE)

(72) Inventor: Johan Jersblad, Gamleby (SE)

(73) Assignee: SAAB AB, Linköping (SE)

( * ) Notice: Subject to any disclaimer, the term of this patent is extended or adjusted under 35 U.S.C. 154(b) by 55 days.

(21) Appl. No.: 18/248,534

(22) PCT Filed: Oct. 13, 2021

(86) PCT No.: PCT/SE2021/051000
§ 371 (c)(1),
(2) Date: Apr. 11, 2023

(87) PCT Pub. No.: WO2022/081070
PCT Pub. Date: Apr. 21, 2022

(65) Prior Publication Data
US 2023/0407139 A1 Dec. 21, 2023

(30) Foreign Application Priority Data

Oct. 15, 2020 (SE) .................................... 2000196-2

(51) Int. Cl.
*C09J 7/28* (2018.01)
*B32B 15/14* (2006.01)
*F41H 3/02* (2006.01)
(52) U.S. Cl.
CPC ................. *C09J 7/28* (2018.01); *B32B 15/14* (2013.01); *F41H 3/02* (2013.01); *B32B 2307/30* (2013.01);
(Continued)

(58) Field of Classification Search
CPC .... C09J 7/28; C09J 2203/354; C09J 2301/41; C09J 2301/502; C09J 2400/163;
(Continued)

(56) References Cited

U.S. PATENT DOCUMENTS 5,778,590 A * 7/1998 Browning ................. B32B 7/06
428/352
2002/0058113 A1* 5/2002 Dimone ................... B60R 13/00
428/31
(Continued)

FOREIGN PATENT DOCUMENTS

WO        88/01363        2/1988
WO        2011063249 A1   5/2011
WO        2019/045625 A1  3/2019

OTHER PUBLICATIONS

International Search Report and Written Opinion mailed Dec. 16, 2021 for International Application No. PCT/SE2021/051000, 15 pages.
(Continued)

*Primary Examiner* — Patricia L. Nordmeyer
(74) *Attorney, Agent, or Firm* — Sage Patent Group

(57) ABSTRACT

The present disclosure relates to a multispectral camouflage tape for temporary multispectral camouflage of objects, such as weapons or military, comprising a camouflage material layer having camouflage properties in the visual and thermal infrared wavelength regions, the camouflage material layer including a textile and a thermal-radiation reflecting material; a tape layer including a tape substrate having an inward-facing side coated with an inner adhesive layer; and a releasable liner layer releasably adhered to the inward-facing side of the tape substrate through the inner adhesive layer, wherein the camouflage material layer is adhered to the tape substrate such that the camouflage material layer and the tape layer form a tape configured to adhered to an
(Continued)

100

100

| Camouflage Material Layer 110 |
|---|
| Tape Layer 120 |
| Releasable Liner Layer 130 |

| Camouflage Material Layer 110 | | Reflecting Material 112 |
| | | Textile 111 |
| Tape Layer 120 | | Tape Substrate 121 |
| | | Inner Adhesive Layer 122 |
| Releasable Liner Layer 130 | | Releasable Liner 130 | object by the inner adhesive layer at an inward-facing side of the tape substrate.

14 Claims, 3 Drawing Sheets

(52) U.S. Cl.
CPC ..... *B32B 2405/00* (2013.01); *C09J 2203/354* (2020.08); *C09J 2301/41* (2020.08); *C09J 2301/502* (2020.08); *C09J 2400/163* (2013.01); *C09J 2400/263* (2013.01); *C09J 2423/046* (2013.01)

(58) Field of Classification Search
CPC .. C09J 2400/263; C09J 2423/046; C09J 7/29; B32B 15/14; B32B 2307/30; B32B 2405/00; B32B 27/08; B32B 2255/02; B32B 5/022; B32B 7/06; B32B 2255/10; B32B 2255/205; B32B 2255/28; B32B 2262/0253; B32B 3/18; B32B 15/08; B32B 2255/26; B32B 2307/40; B32B 7/12; B32B 15/20; B32B 27/36; B32B 33/00; B32B 2307/416; F41H 3/02; C08K 3/013; H01Q 17/005
See application file for complete search history.

(56) References Cited

U.S. PATENT DOCUMENTS

| | | | |
|---|---|---|---|
| 2005/0058816 A1 | 3/2005 | Gorres | |
| 2006/0023327 A1 | 2/2006 | Coombs et al. | |
| 2006/0222827 A1 | 10/2006 | Marshall et al. | |
| 2010/0112316 A1 | 5/2010 | Cincotti et al. | |
| 2010/0255241 A1* | 10/2010 | Wada ........................ | C09J 7/38 |
| | | | 428/41.8 |

OTHER PUBLICATIONS

Extended European Search Report mailed Sep. 23, 2024 for European Patent Application No. 21880667.7, 7 pages.

* cited by examiner

100

| Camouflage Material Layer 110 |
|---|
| Tape Layer 120 |
| Releasable Liner Layer 130 |

100

| Camouflage Material Layer 110 | | Reflecting Material 112 |
|---|---|---|
| | | Textile 111 |
| Tape Layer 120 | | Tape Substrate 121 |
| | | Inner Adhesive Layer 122 |
| Releasable Liner Layer 130 | | Releasable Liner 130 |

Fig. 2    200
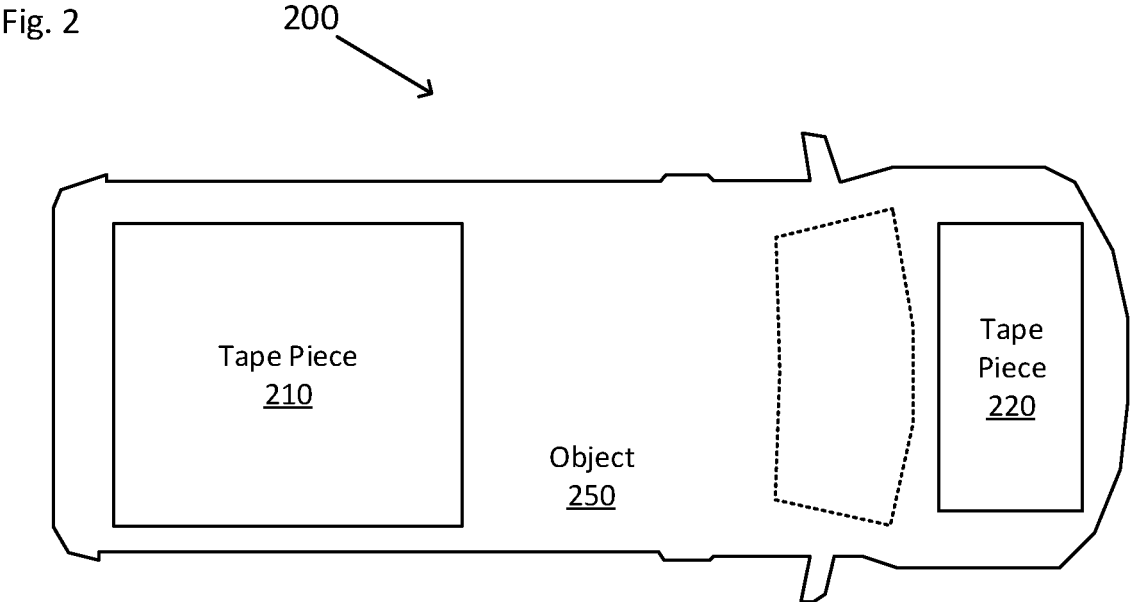

CAMOUFLAGE TAPE, AND CAMOUFLAGE TAPE SYSTEM FOR TEMPORARY MULTISPECTRAL CAMOUFLAGE OF OBJECTS

CROSS-REFERENCE TO RELATED APPLICATIONS

This application is a 35 U.S.C. § 371 national stage application for International Application No. PCT/SE2021/051000, entitled "A CAMOUFLAGE TAPE, AND CAMOUFLAGE TAPE SYSTEM FOR TEMPORARY MULTISPECTRAL CAMOUFLAGE OF OBJECTS", filed on Oct. 13, 2021, which claims priority to Swedish Patent Publication No. 2000196-2, filed on Oct. 15, 2020, the disclosures and contents of which are hereby incorporated by reference in their entireties.

TECHNICAL FIELD

The present disclosure relates to a multispectral camouflage tape for temporary multispectral camouflage of objects, a multispectral camouflage tape system for temporary multispectral camouflage of objects, a weapon system and a vehicle system. More specifically, the disclosure relates to a multispectral camouflage tape for temporary multispectral camouflage of objects, a multispectral camouflage tape system for temporary multispectral camouflage of objects, such as a weapon system or a vehicle system.

BACKGROUND

Historically camouflage materials have generally had an open, apertured structure as, for example, camouflage nets. The covering of such conventional materials is typically partial. An important role of a camouflage system is to prevent detection of warm objects by thermal imaging systems, such that if said objects were captured by a heat-sensitive camera, the generated image would not distinguish said objects from the general terrain. A drawback of partially covering a warm object is that a thermal imaging systems may readily detect a difference between the uncovered regions of the warm object and the environment. Furthermore camouflage nets have the drawback of getting stuck in the environment or getting tangled with itself during use or in storage.

A means of preventing detection by thermal imaging systems is by using a low-emissive camouflage material. Low-emissive materials act by reflecting heat radiation, thus making the camouflaged object appear cooler to the thermal detector.

A known technique to control the amount of thermal radiation leaving an area of an object that is hot during operating conditions is to paint said area with a coating that has low emissivity and high reflectance, thereby appearing to have a temperature closer to the ambient temperature when measured by thermal radiation sensitive cameras. Such a painted coating will typically also need to provide a camouflage in visual wavelengths. For an object used in different environments it may be desirable to change the optical properties accordingly, for example changing the colour of the painted coating in visual wavelengths to match a new environment. Changing the optical properties of such a camouflage typically involves the time intensive work of removing the old paint coating and applying a new paint coating with the desired optical properties. Another challenge with using paints for camouflage is the storage of said paints, as paints may undergo undesired changes over time during storage.

An alternative to paints is to utilize plastic tapes or foils with a camouflage coating to camouflage an object. An example plastic foil for temporary cover of a vehicle is described by US2009252913A1, wherein a plurality of vinyl-layers are used to adapt the visual appearance of a vehicle to different environments.

Camouflage based on plastic tapes or foils address some of the aforementioned problems, however, they typically suffer from one or more of the following problems:

fragile construction that is challenging to handle, store and apply to an object without damaging the camouflage material;
    designed for permanent attachment to the object, thereby complicating the adaptation of camouflage to different environments;
    designed to be removed from the object but leaves residues on the object upon removal; and
    insufficient camouflage properties within the relevant wavelength regions, such as the visual and the thermal wavelength regions.

There is thus a need for improved camouflage for direct application to an objects to be camouflaged.

SUMMARY

It is an object of the present invention to provide a means of overcoming or at least ameliorating some of the above-discussed shortcomings. In particular, it is desirable to provide a means of camouflaging an object that to a significant extent facilitates the avoidance of detection by both thermal and visual (e.g. ocular) detection systems.

These objects are achieved by a composition according to the appended independent claims.

According to a first aspect there is provided a multispectral camouflage tape for temporary multispectral camouflage of objects, such as weapons, military vehicles or other military equipment.

The multispectral camouflage tape comprises a camouflage material layer having at an outward-facing side camouflage properties at least in the visual (VIS) and thermal infrared (TIR) wavelength regions. The camouflage material layer comprising at least a textile and a thermal-radiation reflecting material for making the camouflage tape exhibit a desired emissivity in the thermal wavelength region.

The multispectral camouflage tape further comprises a tape layer comprising a tape substrate having an inward-facing side coated with an inner adhesive layer, and a releasable liner layer releasably adhered to the inward-facing side of the tape substrate through the inner adhesive layer.

An inward-facing side of the camouflage material layer is adhered to an outward-facing side of the tape substrate such that the camouflage material layer and the tape layer form a multispectral camouflage tape configured to temporarily adhered to an object by the inner adhesive layer, after removal of the release liner layer.

This has the advantage of allowing the object be camouflaged more rapidly and requiring less equipment compared to applying camouflage by painting said object. This further has an advantage of providing a robust and more user friendly multispectral camouflage tape.

The multispectral camouflage tape is configured to provide camouflage at least in the visual and at least part of the thermal wavelength region of the electromagnetic spectrum.

Preferably, however, the multispectral camouflage tape is configured to provide camouflage in at least two and preferably all wavelength regions selected from the group consisting of the visual (VIS) wavelength region, the near infrared (NIR) wavelength region, the shortwave infrared (SWIR) wavelength region, the thermal infrared (TIR) wavelength region, and the radar wavelength region. When adapted for winter camouflage, the multispectral camouflage tape is preferably also configured to provide camouflage in the ultraviolet (UV) wavelength region, and, in particular, the UV-A wavelength region of 350-400 nm.

According to some embodiments, the thermal-radiation reflecting material comprises a metal, such as aluminium.

This has the advantage of allowing the multispectral camouflage tape to reflect a significant amount of thermal radiation and emit a relatively small amount of thermal radiation, whereby the thermal signature of the camouflaged object can be made to resemble that of the environment.

According to some embodiments, the camouflage material layer is a multilayer camouflage material layer comprising a metal layer on an outward-facing side of said textile.

This has the advantage of allowing different parts of the camouflage material layer to provide different camouflage properties for different wavelength regions. This further has the advantage of allowing the metal layer to reflect thermal radiation while visual light is absorbed by coloured material arranged on the outward-facing side of the metal layer, thereby providing the desirable reflectance of thermal radiation while reducing undesirable reflection of visual light.

According to some embodiments, the metal layer is formed through physical vapour deposition (PVD) onto said textile.

This has the advantage of allowing the metal layer to be made very thin and with high precision. This further has the advantage of allowing for a more durable multispectral camouflage tape comprising a metal layer with high impact strength.

According to some embodiments, the camouflage material layer comprises a coloured coating on the outward-facing side of the camouflage material layer, the coloured coating constituting an outer exposed layer of the multispectral camouflage tape and providing the multispectral camouflage tape with a desired appearance in VIS, the coating having a high transmissivity in at least the thermal wavelength regions of 3-5 μm and 8-14 μm.

This adds the advantage of being able to adapt the visual signature of the camouflaged object to the surroundings while allowing thermal radiation to pass though the coloured coating and interact with the thermal-radiation reflecting material of the camouflage material layer configured to reflect and emit thermal radiation in a desired way. This further has the advantage of allowing the camouflage material layer to be easily produced at a large scale.

According to some embodiments, the coloured coating comprises a plastic polymer, such as polyethylene, coloured with a pigment, wherein said plastic polymer and said pigment have low absorbing characteristics for wavelength regions.

This has the advantage of providing a durable low-emissive coating that can be easily adapted to different environments by adapting the type and amount of pigment in the plastic.

According to some embodiments, said tape layer is a double-sided tape further comprising an outer adhesive layer coated onto an outward-facing side of the tape substrate, the camouflage material layer being adhered to the outward-facing side of the tape substrate through said outer adhesive layer.

According to some embodiments, the inner adhesive layer of the tape substrate comprises a removable acrylic adhesive arranged to be adhered and removed from said object with the multispectral camouflage tape and object remaining substantially intact.

This adds the advantage of allowing the multispectral camouflage tape to be adhered to an object and be removed from the object without destroying the multispectral camouflage tape and with minimal amounts of adhesive residues on the object.

According to some embodiments, the tape substrate is a plastic polymer film, such as a polyester film.

This has the advantage of allowing for multispectral camouflage tape with high tensile strength and thermal stability. A further advantage of utilizing a plastic polymer films is its use as a moisture and/or gas barrier, allowing more material and design choices to become viable, such as the use of moisture sensitive materials.

According to some embodiments, the multispectral camouflage tape comprises a layer of radar-absorbing material on an inward-facing side of the thermal-radiation reflecting material. In embodiments where the thermal-radiation reflecting material constitutes a metal layer, the metal layer may be a discontinuous metal layer for reduced radar signature of the camouflage tape. The layer of radar-absorbing material does not have to be arranged adjacent to the thermal-radiation reflecting material, there may be one or more layers of various material interposed between the thermal-radiation reflecting material and the layer of radar-absorbing material. For instance, the thermal-radiation reflecting material may be a metal foil or a thermal-radiation reflecting coating arranged on the outward-facing side of the textile and the radar absorbing material may be arranged on an inward-facing side of the textile.

The use of a discontinuous metal layer adds the advantage of allowing radar waves to pass through the discontinuous metal layer.

According to a second aspect there is provided a multispectral camouflage tape system for temporary multispectral camouflage of objects, comprising a plurality of pieces of the above-described multispectral camouflage tape, wherein each piece of multispectral camouflage tape has a shape that is adapted to a particular area of an object to be camouflaged.

Besides the above-mentioned advantages associated with the proposed multispectral camouflage tape, providing the tape in form of pieces that are tailored to the object to be camouflaged is advantageous in that it facilitates application of the tape onto the object, facilitates handling and operation of the object, and further improves the camouflage of the object.

According to some embodiments, the camouflage material layer of at least some of said plurality of camouflage tape pieces differ in composition such that said pieces exhibit different emissivity coefficients, the emissivity of each camouflage tape piece being adapted to a typical operational temperature of the area of the object for which the piece is intended.

This has the advantage of allowing camouflage of an object, such as a vehicle or weapon, with pieces of multispectral camouflage tape wherein each piece may be configured to reflect and emit electromagnetic radiation based on the optical properties and operating temperature of the area of the object onto which said piece is applied.

According to a third aspect there is provided a weapon system comprising a multispectral camouflage tape system according to the second aspect.

According to a fourth aspect there is provided a vehicle system comprising a multispectral camouflage tape system according to the second aspect.

Effects and features of the second through fourth aspects are to a large extent analogous to those described above in connection with the first aspect. Embodiments mentioned in relation to the first aspect are largely compatible with the second through fourth aspects.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

Terminology

The terms inward-facing and outward-facing are to be interpreted as the directions towards and away from an object onto which the multispectral camouflage tape is intended to be adhered.

The terms visual (VIS) wavelength regions is to be interpreted as the wavelengths that are visible to the human eye, approximately 380 to 740 nanometres.

The term thermal wavelength regions is to be interpreted as the wavelengths predominantly emitted by a black body in a temperature range comprising the ambient temperature and the apparent object temperature, such as 2 to 15 µm for 270 to 370 Kelvin. The thermal wavelength regions corresponds to the thermal infrared (TIR) region.

The term thermal-radiation reflecting material is to be interpreted as a material configured to reflect radiation in the corresponding thermal wavelength region. The thermal-radiation reflecting material may function as a radiant barrier.

The term radar-absorbing material is to be interpreted as a material with high absorbance for at least some radio and/or microwave wavelengths, typically ranging in wavelength from 0.01 to 100 meters.

BRIEF DESCRIPTION OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

FIG. 2 depicts schematically a multispectral camouflage tape system for temporary camouflage of an object.

DETAILED DESCRIPTION

Figure 1A:
FIGS. 1a, 1b and 1c depict schematically examples of multispectral camouflage tape.

Throughout the figures, same reference numerals refer to same parts, concepts, and/or elements. Consequently, what will be said regarding a reference numeral in one figure applies equally well to the same reference numeral in other figures unless not explicitly stated otherwise.

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

Figure 1B:
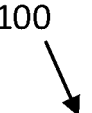
Figure 1C:
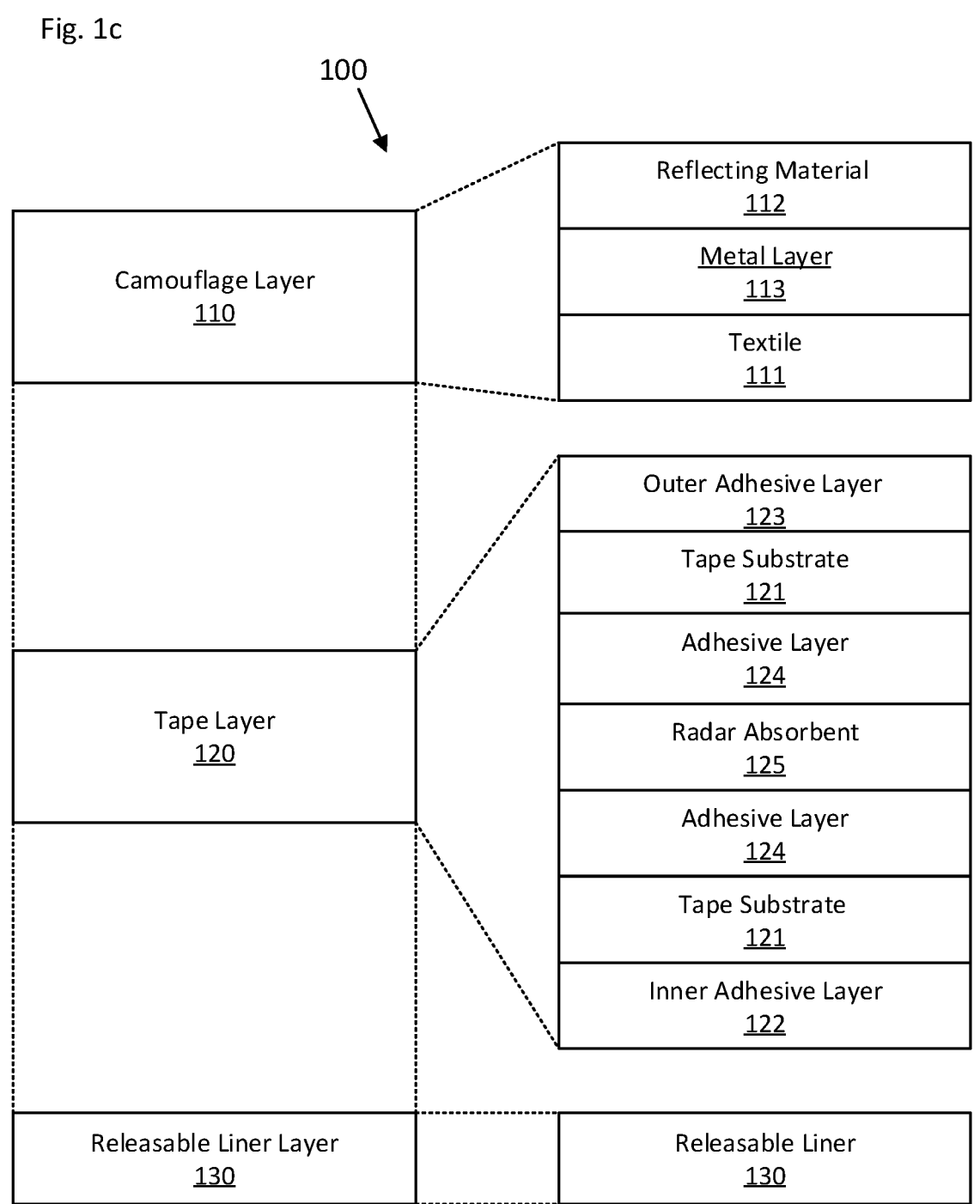

FIGS. 1a, 1b, and 1c illustrate example multispectral camouflage tapes 100. FIG. 1a illustrates the three main layers 110,120,130 of the multispectral camouflage tape 100. FIG. 1b illustrates an example composition of said layers 110,120,130 of the multispectral camouflage tape 100. FIG. 1c illustrates another example composition of said layers 110,120,130 comprising additional layers configured to absorb, reflect or transmit electromagnetic radiation. It is to be understood that even though the illustrations depict layers and layer parts with distinct borders the multispectral camouflage tape may comprise layers and/or layer parts that intermingle and/or extend into each other.

FIG. 1a depicts schematically the multispectral camouflage tape 100 for temporary camouflage of objects. The example multispectral camouflage tape 100 comprises a camouflage material layer 110, a tape layer 120, and a releasable liner layer 130. The camouflage material layer 110 is arranged to provide camouflage properties at least in the visual (VIS) and thermal infrared (TIR) wavelength regions. The tape layer 120 is arranged to provide adhesion at the inward-facing side between the multispectral camouflage tape and the surface of an object said tape 100 is being attached to. The releasable liner layer 130 is arranged to protect the tape layer 120 from the environment prior to adhesion of said tape layer 120 to said object. The releasable liner layer 130 being arrange to be removed from the inward-facing side of the tape layer 120, thereby revealing the tape layer 120.

In some examples the camouflage material layer 110 is configured to essentially provide non-specular reflection. This may be achieved by providing a coating comprising a matting agent, such as a polymeric matting agent, on the outward-facing side of the camouflage material layer 110.

FIG. 1b depicts the example the multispectral camouflage tape 100 wherein the camouflage material layer 110 comprises a thermal-radiation reflecting material 112 and a textile 111. The tape layer 120 comprises a tape substrate 121 and an inner adhesive layer 122.

In some examples the thermal-radiation reflecting material 112 is coated onto the textile 111. In some of these examples the thermal-radiation reflecting material 112 is coated onto the outward-facing side of the textile 111.

In some examples the thermal-radiation reflecting material 112 comprises a metal layer.

In some examples the thermal-radiation reflecting material 112 comprises a metal layer deposited onto the textile 111.

In some examples the metal layer is formed through physical vapour deposition (PVD) of said textile 111.

In some examples the thermal-radiation reflecting material 112 comprises conductive fibres comprised in the textile 111.

In some examples the textile 111 comprise flashspun high-density polyethylene fibres.

In some examples the textile 111 comprise polyethylene, polyester, polyamide, and/or cotton.

In some examples the coated textile 111 is embossed, wherein embossing provides a low specular reflection surface.

In some examples the tape substrate 122 and the textile 111 are attached to each other by an adhesive at the outward-facing side of the tape substrate 122. In some examples the tape substrate 122 and the textile 111 are attached to each other by thermal bonding. In some examples the inward-facing side of the textile 111 is surface treated, such as a treatment to increasing surface roughness, to obtain improved attachment between the camouflage material layer 110 and the tape layer 120.

In some examples the tape substrate 122 and the textile 111 are attached to each other by hot lamination.

In some examples the tape substrate 122 and the textile 111 are attached to each other by sewing the tape substrate 122 and the textile 111 together.

In some examples the thermal-radiation reflecting material 112 comprises a metal, such as aluminium. In some of these examples the thermal-radiation reflecting material 112 comprises copper, silver, nickel, and/or steel. In examples the thermal-radiation reflecting material 112 comprises metallic effect pigments.

In some examples the tape substrate 122 comprises a foam material. In some of these examples the tape substrate 122 comprises polyurethane foam. In some of these examples the tape substrate 122 is a layer of polyurethane foam. In some of these examples the layer of polyurethane foam is 1 to 10 millimetres thick. The use of a foam material may provide thermal insulation between the sides of the tape substrate 122.

In some examples the camouflage material layer 110 comprises a coloured coating on an outward-facing side of the camouflage material layer 110, the coloured coating constituting an outer exposed layer of the multispectral camouflage tape 100 and providing the multispectral camouflage tape 100 with a desired appearance in VIS. In some of these examples the coloured coating has a high transmissivity in at least the thermal wavelength regions of 3-5 μm and 8-14 μm. The high transmissivity allows the thermal radiation to pass through said coloured coating and interact with another part of the multispectral camouflage tape 100 configured to have a desired interaction with said thermal radiation. The coloured coating may further comprise the above-mentioned matting agent for specular reflection reduction.

In some of these examples the textile 111 is coated with a coloured coating on an outward-facing side of the textile 111.

In some examples the coloured coating comprises a plastic polymer, such as a polyethylene. In some of these examples said plastic polymer is coloured with a pigment having low absorbing characteristics for said thermal wavelength regions.

In some examples the coloured coating comprises polyvinyl chloride (PVC), polyurethane, polyolefin and/or acrylic.

In some examples the textile 111 is coated with polyvinyl chloride (PVC), polyurethane, polyolefin, and/or acrylic.

In some examples the inner adhesive layer 122 of the tape layer 120 comprises a removable acrylic adhesive arranged to adhered and be removed from said object with the multispectral camouflage tape and object remaining substantially intact.

In some examples the tape substrate 121 is a plastic polymer film, such as a polyester film.

FIG. 1c. depict schematically a multispectral camouflage tape comprising multiple layers configured to reflect or absorb radiation. In the example multispectral camouflage tape 100, the camouflage material layer 110 comprises a thermal-radiation reflecting material 112, a textile 111 and a metal layer 113 arranged at the outward-facing side of the textile 111.

In the example multispectral camouflage tape 100 the tape layer 120 comprises a radar-absorbing material 125, two tape substrates 121, an outer adhesive layer 124 and an inner adhesive layer 122. The radar-absorbing material 125 being surrounded by the two tape substrates 121, wherein with the two tape substrates 121 and the radar-absorbing material 124 are held together by adhesive layers 124 on each side of the radar-absorbing material 125.

In some examples the multispectral camouflage tape 100 comprises at least two tape substrates 121 and a radar-absorbing material 125 arranged between said at least two tape substrates 121.

In some embodiments the multispectral camouflage tape comprises a layer of radar-absorbing material 125.

In some embodiments the multispectral camouflage tape comprises a layer of radar-absorbing material 125 with a thickness in the range of 1 to 10 millimetres.

In some examples the camouflage material layer 110 comprises a plurality of textile 111 layers. In some of these examples each layer of textile 111 is covered with a different material, such as an applied coloured coating or a physical vapour deposition of a metal layer 113.

In some examples said tape layer 120 is a double-sided tape layer 120, wherein the tape layer 120 comprises an outer adhesive layer 123 coated onto an outward-facing side of the tape substrate 121, and wherein said outer adhesive layer 123 holds together the camouflage material layer 110 and the tape layer 120.

In some examples the multispectral camouflage tape 100 comprises a layer of radar-absorbing material 125, such as carbonyl iron and polyaniline.

In some examples the multispectral camouflage tape 100 comprises a layer of radar-absorbing material 125 on an inward-facing side of said metal layer 113, the metal layer 113 being a discontinuous metal layer for reduced radar signature of the camouflage tape 100.

FIG. 2 depicts schematically a multispectral camouflage tape system 200 for temporary camouflage of an object 250. The multispectral camouflage tape system 200 comprises a plurality of pieces of multispectral camouflage (MC) tape 210,220 each configured to be attached to a specific area of said object 250. The multispectral camouflage tape pieces 210,220 may be pieces of multispectral camouflage tape 100 described in FIG. 1*a*, FIG. 1*b* or FIG. 1*c*. Each camouflage tape 100 piece has a shape that is adapted to a particular area of an object 250 to be camouflaged.

In some examples the camouflage material layers of at least some of said plurality of pieces differ in composition such that the pieces exhibit different emissivity coefficients, the emissivity of each piece being adapted to a typical operational temperature of the area of the object for which the piece is intended.

In the example multispectral camouflage tape system 200 depicted in FIG. 2 a first piece 210 of multispectral camouflage tape may be configured to be arranged on a area of the object that is expected to have substantially the same temperature as the environment, such as the roof of a vehicle, while a second piece 220 of multispectral camouflage tape may be configured to be arranged on an area of the object that is expected to have the temperature above the temperature of the environment, such as an area around the engine of a vehicle. In some of these examples the second piece 220 of multispectral camouflage tape has a low emissivity for thermal radiation in order to reduce the thermal radiation from the hot area. In some examples the first piece 210 of multispectral camouflage tape is configured to be arranged on an area that may be detectable by radar, and have high radar radiation absorption properties.

In some examples (not shown) the object to be camouflaged by the multispectral camouflage tape system is a weapon system. In some of these examples the multispectral camouflage tape pieces arranged to camouflage the barrel of the weapon system may have lower emissivity than pieces of the multispectral camouflage tape system that are arranged to camouflage other (typically colder) parts of the weapon system.

The person skilled in the art realizes that the present disclosure is not limited to the preferred embodiments described above. The person skilled in the art further realizes that modifications and variations are possible within the scope of the appended claims. For example, multispectral camouflage tape for training purposes configured to provide camouflage at some wavelengths and provide ease of detection at other wavelengths, such as providing camouflage for the wavelengths used by those training while providing ease of detection in wavelengths used by those overseeing said training. Additionally, variations to the disclosed embodiments can be understood and effected by the skilled person in practicing the claimed disclosure, from a study of the drawings, the disclosure, and the appended claims.

The invention claimed is:

1. A multispectral camouflage tape for temporary multispectral camouflage of objects, such as weapons, military vehicles or other military equipment, comprising:

a camouflage material layer having at an outward-facing side configured to provide camouflage properties at least in the visual (VIS) and thermal infrared (TIR) wavelength regions, the camouflage material layer comprising at least a textile and a thermal-radiation reflecting material configured to reflect radiation in the thermal wavelength region, a tape layer comprising a tape substrate having an inward-facing side coated with an inner adhesive layer, and a releasable liner layer releasably adhered to the inward-facing side of the tape substrate through the inner adhesive layer, wherein an inward-facing side of the camouflage material layer is adhered to an outward-facing side of the tape substrate such that the camouflage material layer and the tape layer form a multispectral camouflage tape configured to be removably adhered to and detached from an object without substantial residue or damage, and wherein the camouflage material layer comprises a coloured coating on an outward-facing side of the camouflage material layer, the coloured coating constituting an outer exposed layer of the camouflage tape and the coating having a high transmissivity in at least the thermal wavelength regions of 3-5 μm and 8-14 μm.

2. The multispectral camouflage tape according to claim 1, wherein the thermal-radiation reflecting material comprises a metal.

3. The multispectral camouflage tape according to claim 2, wherein the metal comprises aluminum.

4. The multispectral camouflage tape according to claim 1, wherein the camouflage material layer comprises a metal layer on an outward-facing side of said textile.

5. The multispectral camouflage tape according to claim 4, wherein the metal layer is formed through physical vapour deposition (PVD) onto said textile.

6. The multispectral camouflage tape according to claim 1, wherein the coloured coating comprises a plastic polymer, such as polyethylene, coloured with a pigment.

7. The multispectral camouflage tape according to claim 1, wherein the textile comprises flashspun high-density polyethylene fibres.

8. The multispectral camouflage tape according to claim 1, wherein the inner adhesive layer of the tape layer comprises a removable acrylic adhesive.

9. The multispectral camouflage tape according to claim 1, further comprising a layer of radar-absorbing material on an inward-facing side of thermal-radiation reflecting material, the thermal-radiation reflecting material comprising a metal layer being a discontinuous metal layer configured to reduced radar signature of the multispectral camouflage tape.

10. The multispectral camouflage tape according to claim 1, wherein said tape layer is a double-sided tape further comprising an outer adhesive layer coated onto an outward-facing side of the tape substrate, the camouflage material layer being adhered to the outward-facing side of the tape substrate through said outer adhesive layer.

11. A multispectral camouflage tape system for temporary multispectral camouflage of an object, comprising a plurality of pieces of multispectral camouflage tape according to claim 1, wherein each camouflage tape piece has a shape that is adapted to a particular area of said object to be camouflaged.

12. The multispectral camouflage tape system according to claim 11, wherein the camouflage material layer of at least some of said plurality of camouflage tape pieces differ in composition such that said pieces exhibit different emissivity coefficients.

13. A weapon system comprising a multispectral camouflage tape system according to claim 11.

14. A vehicle system comprising a multispectral camouflage tape system according to claim 11.

* * * * *